United States Patent [19]

Hodgins

[11] Patent Number: 4,703,000

[45] Date of Patent: Oct. 27, 1987

[54] ANTI-BRICK/ANTI-STATIC COMPOSITIONS USEFUL FOR TREATING FILM SURFACES AND FILMS COATED THEREWITH

[75] Inventor: George R. Hodgins, South Hadley, Mass.

[73] Assignee: James River Graphics, Inc., South Hadley, Mass.

[21] Appl. No.: 781,704

[22] Filed: Sep. 30, 1985

[51] Int. Cl.$^4$ .................... G03C 1/82; G03C 11/00
[52] U.S. Cl. .................... 430/493; 252/8.6; 252/8.7; 252/8.8; 252/88; 252/155; 252/158; 430/527; 430/528; 430/529; 430/463
[58] Field of Search .............. 430/493, 527, 528, 529, 430/463; 252/8.6, 8.7, 8.8, 88, 155, 158

[56] References Cited

U.S. PATENT DOCUMENTS

| | | | |
|---|---|---|---|
| 3,736,259 | 5/1973 | Caldwell | 252/89 |
| 3,748,268 | 7/1973 | Loudas | 252/90 |
| 3,919,101 | 11/1975 | Anstett et al. | 252/90 |
| 4,244,834 | 1/1981 | Schwalley et al. | 252/106 |
| 4,547,300 | 10/1985 | Lareau | 252/174.21 X |
| 4,566,980 | 1/1986 | Smith | 252/88 X |

*Primary Examiner*—John E. Kittle
*Assistant Examiner*—Mukund J. Shah
*Attorney, Agent, or Firm*—Burns, Doane, Swecker & Mathis

[57] ABSTRACT

Provided herewith is an anti-brick/anti-static composition useful for treating film surfaces. The composition comprises (i) an anionic or cationic surfactant exhibiting anti-static properties, and (ii) a similar charged inorganic particle, e.g., a negatively charged silica or positively charged alumina coated silica, having an average particle size of less than 0.1 micron. Upon coating a film surface with the composition, good anti-static properties are realized without experiencing problems with bricking or blocking of the film. The composition is particularly useful in coating microfilm since it also provides the anti-brick/anti-static properties without deleteriously effecting the viewing capabilities of the film over a wide range of magnifications.

13 Claims, No Drawings

ANTI-BRICK/ANTI-STATIC COMPOSITIONS USEFUL FOR TREATING FILM SURFACES AND FILMS COATED THEREWITH

BACKGROUND OF THE INVENTION

1. Field of the Invention

The present invention relates to a composition of matter which provides anti-static and anti-brick properties when coated on a film surface. The present invention relates to film, and in particular microfilm, having coated thereon the anti-brick/anti-static composition.

2. Description of the Prior Art

The application of antistatic agents to prevent static buildup on film products is known as a general concept. The use of various specific materials to prevent bricking or blocking of films is also known to the art. For example, some of the most useful antistatic agents for use on film materials are the quaternary ammonium salts of N,N dimethyl, N-(2-hydroxyethyl) stearamidopropylamine. In particular, stearamidopropyldimethylhydroxyethyl ammonium nitrate has been used to prevent static buildup on film materials. A commercial grade of this material, Catanac SN, is manufactured by the American Cyanamid Company.

One of the disadvantages in using antistatic agents of this type, however, is their tendency to promote bricking or blocking of film surfaces. This is particularly true for films coated with diazo or vesicular microfilm emulsions.

The bricking or blocking of films containing antistatic agents may be reduced or prevented by applying small quantities of a lubricant or particulate spacing material to the surface of the films. The literature contains many references to the use of particulate materials such as silica, talc, and the like for use in preventing bricking.

The particle size of effective anti-bricking agents, however, has caused a problem in becoming visible during the viewing of the film. This is particularly true in the viewing of microfilm products, which generally are used over a wide range of magnification as well. Because of this visibility requirement, most anti-bricking materials have been unsatisfactory for use on microfilm products. Moreover, as the particle size of the anti-bricking agent is reduced, in an attempt to reduce its visibility, it becomes less effective as an anti-bricking agent as it loses its capacity to act as a "spacer" particle to separate the film surfaces.

Accordingly, it is an object of the present invention to provide a novel anti-brick/anti-static composition which is truly effective with regard to both properties.

Another object of the present invention is to provide an effective anti-brick/anti-static composition which exhibits good compatibility and stability.

Yet another object of the present invention is to provide an effective anti-brick/anti-static composition which does not result visibility problems upon viewing a film coated with the composition.

Another object of the present invention is to provide a film product, and in particular a microfilm product, having coated thereon such a novel anti-brick/anti-static composition.

Still another object of the present invention is to provide an effective anti-brick/anti-static composition which resists rub-off from a film surface during handling.

These and other objects, as well as the scope, nature and utilization of the invention, will be apparent to those skilled in the art from the following description and the appended claims.

SUMMARY OF THE INVENTION

In accordance with the foregoing objectives, provided herewith is an anti-brick/anti-static composition useful in the treatment of film surfaces. The composition comprises (i) an anionic or cationic surfactant exhibiting anti-static properties, and (ii) a similar inorganic particle having an average particle size of less than 0.1 micron. Among the preferred cationic surfactants are the quaternary ammonium salts, and in particular the quaternary ammonium salt of N,N dimethyl, N-(2-hydroxyethyl)stearamidopropylamine available under the trademark Catanac SN. Among the preferred anionic surfactants are the amine salts of lauryl sulfate, and in particular such an anionic surfactant available under the trademark Duponol G. An example of a preferred inorganic particle for use with a cationic surfactant is a positively charged alumina coated silica particle, such as that available from the Wesolite Company under the trademark Wesol P. An example of a preferred inorganic particle for use with an anionic surfactant is a negatively charged silica particle, such as that available from DuPont under the trademark Ludox HS-30.

Upon coating a film surface with the composition of the present invention, good anti-static properties are realized without experiencing a problem with bricking or blocking of the film. The composition is particularly useful in coating microfilm.

DETAILED DESCRIPTION OF THE PREFERRED EMBODIMENTS

The first component of the composition of the subject invention is an anionic or cationic surfactant having anti-static properties. Such surfactants are well known in the industry.

Some of the most useful cationic antistatic agents for use in the present invention are the quaternary ammonium salts of N,N dimethyl, N-(2-hydroxyethyl)-stearamidopropylamine. In particular, stearamidopropyldimethyl-hydroxyethyl ammonium nitrate is useful to prevent static buildup on film materials, a commercial grade of which is manufactured by the American Cyanamid Company under the trademark Catanac SN.

Examples of suitable anionic surfactants include the benzene sulfonates, metal salts of polymeric carboxylic acids, polystyrene sulfonates and sulfates of alcohols. Specific preferred examples of suitable anionic surfactants include a sodium dodecyl benzene sulfonate, such as that available from Alcolac, Inc. under the trademark Siponate DS-4; a sodium salt of a polyfunctional oligomer, such as that available from Uniroyal under the trademark Poly Wet ND-2; a sodium salt of a polymeric carboxylic acid, such as that available under the trademark Tamol SN from Rohm & Haas; a polystyrene sulfonate, such as that available from National Starch under the trademark Versa TL-127; and, an amine salt of lauryl sulfate available from DuPont under the trademark Duponol G. Of the foregoing anionic surfactants, Duponol G is the most preferred due to its ability to produce an excellent, clear, spot-free coating.

The second component of the composition of the subject invention is that of an inorgaic particle having a charge the same as that of the surfactant of the composition, which inorganic particle has an average particle size of less than about 0.1 micron. It is the combination of the surfactant with the similarly charged inorganic particle having the average particle size of less than about 0.1 micron, which size has heretofore been believed to be too small for anti-blocking properties, that enables one to achieve the advantages of the present invention. Namely, good compatibility and stability between the two components, good dry film compatibility, and good anti-static properties without promoting bricking or blocking of the film, are all realized importantly without effecting the viewing capability of the film. The composition also exhibits excellent resistance to rub-off from a film surface during handling. Hence, the anti-brick properties will be maintained.

Of the various known inorganic materials suitable for use with a cationic surfactant in the formulation of the present invention, the most preferred is a positively charged alumina coated silica particle. In particular, the material is a positively charged alumina-silica sol containing 23% $SiO_2$ and 4% $Al_2O_3$, having an average particle size of 15 millimicrons, a particle size that past teachings would suggest is too small for achieving good performance as an anti-bricking agent. A commercial form of this material is available under the trademark Wesol P and is available from the Wesolite Company, Wilmington, Del. The positively charged alumina-silica sol is completely compatible with an aqueous solution of cationic surfactants such as the Catanac SN type of antistatic agent.

Another advantage of the present invention is the extremely low concentrations of the anti-bricking component in order to effect its excellent performance. For example, concentrations of less than 0.5 gram per square meter of anti-bricking component on the film surface are suitable. This has been found to be particularly true with the Wesol P alumina-silica sol, which was particularly surprising and unexpected in the light of its extremely small particle size (15 millimicrons). Because of such small particle size and the possibility of extremely low application loading to film surfaces, the alumina-silica sol is not visible over a wide range of microfilm reader magnifications, and is, therefore, extremely well suited for use as an anti-bricking agent for microfilm and other photographic materials, as are the anti-bricking agents of the present invention in general. In addition, the extremely low application of the alumina-silica sol to film surfaces provides strong bonding to the film surfaces (presumably by electrostatic or chemical forces), and eliminates or greatly reduces removal from the film surface by normal abrasion experienced during coating or customer use.

An example of the preparation of an anti-brick/antistatic formulation employing a cationic surfactant and positively charged inorganic particle is the following:

| Ingredient | % By Weight | % Solids |
| --- | --- | --- |
| Water | 99.499 | — |
| Catanac SN | 0.169 | 0.0845 |
| Wesol P | 0.332 | 0.0996 |
| | 100.000 | 0.1841 |

Among the various known inorganic materials which are suitable for use with anionic surfactants in the formulation of a composition in accordance with the present invention, the most preferred are negatively charged silica particles. Examples of those most preferred are the silica particles of the Ludox class available from DuPont, e.g.,

| | Average Particle Diam. - Nanometers | pH | Silica Wgt % |
| --- | --- | --- | --- |
| Ludox HS-30 | 12 | 9.8 | 30 |
| Ludox HS-40 | 12 | 9.7 | 40 |
| Ludox TM | 22 | 9.0 | 50 |
| Ludox SM | 7 | 9.9 | 30 |
| Ludox AM | 12 | 8.9 | 30 |
| Ludox LS | 12 | 8.4 | 30 | with the silica available under the trademark Ludox HS-30 being most preferred.

The composition of the present invention is suitably applied to a film using any appropriate solvent system. It is most preferred, however, that an aqueous solution be employed for reasons of practicality and efficiency. The amount of surfactant, in weight percent, in the solution applied to the film generally ranges from about 0.01 to 0.5 weight percent, and more preferably from about 0.05 to about 0.4 weight percent. The amount of inorganic particle in the applied solution is generally in the range of from about 0.01 to about 0.5 weight percent, and more preferably from about 0.05 to about 0.4 weight percent.

The anti-brick/antistatic composition may be applied to film surfaces by a variety of conventional coating methods, e.g., roller application followed by air knife removal of excess coating. The application is then generally followed by removal of water by drying.

Film supports may comprise films such as polyester (polyethylene terephthalate), polystyrene cellulose acetate, cellulose triacetate, polyethylene or other conventional films.

While the anti-brick/antistatic compositions of the present invention find particular applicability in diazo and vesicular microfilm products, the composition may be applied to any opaque or transparent film or web surface where a combination of anti-brick and antistatic properties are required, and where invisibility of the anti-brick/antistatic film layer and good adhesion without use of a resin binder is required.

The following example is given as a specific illustration of the claimed invention. It should be understood, however, that the specific details set forth in the example are merely illustrative and in nowise limitative. All parts and percentages in the example and the remainder of the specification are by weight unless otherwise specified.

EXAMPLE

A number of anionic surfactants having conductive properties were combined with an anionic silica dispersion (Ludox HS-30) and coated onto a polyester film base from an aqueous solution.

The formula used for each experiment was the following:

| Component | Weight - Grams |
| --- | --- |
| Water | 99.499 |
| Conductive Anionic Surfactant | 0.098-0.398 |
| Ludox HS-30 | 0.332 |

In each case, the aqueous solution was coated onto an I.C.I. polyester base, 516 type, 5 mil thickness, using a

6 Mayer Rod. The coated films were then placed in an 80° C. oven for 2 minutes to dry.

Resistivity was then measured using a Model 1864 General Radio Megohmmeter connected to a 610 Electronic Probe.

The results obtained were as follows:

| Anionic Surfactant | Resistivity Readings - Ohms/Sq. | Film Appearance |
| --- | --- | --- |
| Siponate DS-4 | 1.9–3.5 × $10^{10}$ | Spotty |
| Tamol SN | 2.5–4.5 × $10^8$ | Some fine circular spots |
| Poly Wet ND | 5–6 × $10^8$ | Spotty |
| Versa TL-127 | 3.5 × $10^8$ | Spotty |
| Duponol G | 3–7 × $10^8$ | Excellent clarity No spots |

All of the above surfactants produced conductivity sufficient to dissipate static from the film. Duponol G produced an excellent, clear, spot-free coating. All films exhibited good anti-bricking characteristics.

| Identification of Anionic Surfactants Used | | |
| --- | --- | --- |
| Name | Manufacturer | Composition |
| Siponate DS-4 (23% Solids) | Alcolac, Inc. | Sodium Dodecyl Benzene Sulfonate |
| Poly Wet ND-2 (25% Solids) | Uniroyal | Sodium Salt of Polyfunctional Oligomer |
| Tamol SN | Rohm & Haas | Sodium Salt of Polymeric Carboxylic Acid |
| Versa TL-127 (30% Solids) | National Starch | Polystyrene Sulfonate |
| Duponol G (92%) | du Pont | Amine Salt of Lauryl Sulfate |

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An anti-brick/anti-static composition useful for treating film surfaces, comprising
   (i) a surfactant having anti-static properties, which is a quaternary ammonium salt of N,N dimethyl, N-(2-hydroxyethyl)stearamidopropylamine, and
   (ii) a similar charged inorganic particle having an average particle size less than 0.1 micron.

2. An anti-brick/anti-static composition useful for treating film surfaces, comprising
   (i) a cationic surfactant having anti-static properties, and
   (ii) a similar charged inorganic particle having an average particle size less than 0.1 micron which is a positively charged alumina/silica sol.

3. The anti-brick/anti-static composition of claim 1, comprising a similar charged inorganic particle having an average particle size less than 0.1 micron which is a positively charged alumina/silica sol.

4. An aqueous solution of an anti-brick/anti-static composition useful for treating film surfaces, which composition comprises
   (i) a cationic surfactant having anti-static properties, and
   (ii) a similar charged inorganic particle having an average particle size less than 0.1 micron, wherein the amount of the inorganic particle in the solution is such that upon coating a film with the aqueous solution the concentration of the inorganic particle on the film is less than 0.5 gram per square meter.

5. An aqueous solution of an anti-brick/anti-static composition useful for treating film surfaces, which composition comprises
   (i) a cationic surfactant having anti-static properties, and
   (ii) a similar charged inorganic particle having an average particle size less than 0.1 micron,
   wherein the amount of surfactant (i) in the solution ranges from 0.01 to 0.5 weight percent, and the amount of inorganic particle (ii) in the solution ranges from about 0.01 to 0.5 weight percent.

6. A film comprising a coating of an anti-brick/anti-static composition, which composition comprises
   (i) a surfactant having anti-static properties wherein the surfactant is a quaternary ammonium salt of N,N dimethyl, N-(2-hydroxyethyl)stearamidopropylamine, and
   (ii) a similar charged inorganic particle having an average particle size less than 0.1 micron.

7. The film of claim 6 comprising a coating of an anti-brick/anti-static composition, which composition comprises a similar charged inorganic particle having an average particle size less than 0.1 micron which is a positively charged alumina/silica sol.

8. A film comprising a coating of an anti-brick/anti-static composition, which composition comprises
   (i) an anionic or cationic surfactant having anti-static properties, and
   (ii) a similar charged inorganic particle having an average particle size less than 0.1 micron, wherein the concentration of the inorganic particle on the film is less than 0.5 gram per square meter.

9. A film comprising a coating of an anti-brick/anti-static composition, which composition comprises
   (i) an anionic or cationic surfactant having anti-static properties, and
   (ii) a similar charged inorganic particle having an average particle size less than 0.1 micron, wherein the coating of the film is achieved with an aqueous solution wherein the amount of surfactant (i) in the solution ranges from 0.01 to 0.5 weight percent, and the amount of inorganic particle (ii) in the solution ranges from about 0.01 to 0.5 weight percent.

10. Microfilm comprising a coating of an anti-brick/anti-static composition, which composition comprises
    (i) a surfactant having anti-static properties wherein the surfactant is a quaternary ammonium salt of N,N dimethyl, N-(2-hydroxyethyl)stearamidopropylamine, and
    (ii) a similar charged inorganic particle having an average particle size less than 0.1 micron.

11. The microfilm of claim 10 comprising the coating of an anti-brick/anti-static composition, which composition comprises a similar charged inorganic particle having an average particle size of less than 0.1 micron which is a positively charged alumina/silica sol.

12. Microfilm comprising a coating of an anti-brick/anti-static composition, which composition comprises
    (i) an anionic or cationic surfactant having anti-static properties, and
    (ii) a similar charged inorganic particle having an average particle size less than 0.1 micron,
    wherein the concentration of the inorganic particle on the film is less than 0.5 gram per square meter.

13. Microfilm comprising a coating of an anti-brick-/anti-static composition, which composition comprises
  (i) an anionic or cationic surfactant having anti-static properties, and
  (ii) a similar charged inorganic particle having an average particle size less than 0.1 micron, wherein the coating of the film is achieved with an aqueous solution wherein the amount of surfactant (i) in the solution ranges from 0.01 to 0.5 weight percent, and the amount of inorganic particle (ii) in the solution ranges from about 0.01 to 0.5 weight percent.

* * * * *